United States Patent
Bala et al.

(10) Patent No.: US 11,989,182 B2
(45) Date of Patent: May 21, 2024

(54) SYSTEMS AND METHOD FOR DYNAMICALLY UPDATING MATERIALITY DISTRIBUTIONS AND CLASSIFICATIONS

(71) Applicant: TRUVALUE LABS, INC., San Francisco, CA (US)

(72) Inventors: Greg Paul Bala, Auburn, CA (US); Michael Alfred Flowers, Alameda, CA (US); Adam L. Salvatori, Cortlandt Manor, NY (US); Sebastian Brinkmann, San Francisco, CA (US); Stephen Malinak, Napa, CA (US); Eli Reisman, Berkeley, CA (US); Andrew Shipley, Brooklyn, NY (US); Mark Strehlow, San Francisco, CA (US); Hendrik Bartel, San Francisco, CA (US); Philip Kim, Redwood City, CA (US); James Hawley, Oakland, CA (US); Edwin Kuh, New York, NY (US)

(73) Assignee: TruValue Labs, INC., San Francisco, CA (US)

( * ) Notice: Subject to any disclaimer, the term of this patent is extended or adjusted under 35 U.S.C. 154(b) by 0 days.

(21) Appl. No.: 17/146,822

(22) Filed: Jan. 12, 2021

(65) Prior Publication Data
US 2021/0216542 A1    Jul. 15, 2021

Related U.S. Application Data

(60) Provisional application No. 62/960,687, filed on Jan. 13, 2020.

(51) Int. Cl.
*G06F 16/2455* (2019.01)
(52) U.S. Cl.
CPC .............................. *G06F 16/2455* (2019.01)

(58) Field of Classification Search
None
See application file for complete search history.

(56) References Cited

U.S. PATENT DOCUMENTS

| 11,132,721 B1 * | 9/2021 | Uthaman ............. G06F 16/951 |
| 2012/0316916 A1 | 12/2012 | Andrews et al. |

(Continued)

OTHER PUBLICATIONS

Notification of Transmittal of the International Search Report and the Written Opinion of the International Searching Authority dated Mar. 25, 2021 issue for PCT/US2021/13054.

*Primary Examiner* — Christopher J Raab
(74) *Attorney, Agent, or Firm* — Hunton Andrews Kurth LLP

(57) ABSTRACT

A data analysis system for measuring a materiality feature of interest is disclosed. The system includes a computing cluster ingesting content comprising a plurality of observables relevant to an entity, wherein each observable is related to at least one feature of interest. The system further includes an extraction engine running on the computing cluster and tagging the observables with an entity identifier in response to the observables referencing at least one of an entity, a tradename associated with the entity, or product associated with the entity. Additionally, the system includes an analysis engine running on the computing cluster and tagging an observable in response to the feature of interest being related to the observable. In one embedment, the analysis engine measures the materiality of the feature of interest to the entity by counting a number of observables from the plurality of observables tagged with the entity identifier.

5 Claims, 24 Drawing Sheets

(56) References Cited

U.S. PATENT DOCUMENTS

| | | |
|---|---|---|
| 2014/0236859 A1 | 8/2014 | Chanavat |
| 2015/0142520 A1 | 5/2015 | Bala et al. |
| 2016/0117393 A1* | 4/2016 | von Rickenbach .... G06Q 30/06 707/723 |
| 2016/0196304 A1* | 7/2016 | Nair .................... G06F 16/2455 707/769 |
| 2017/0011092 A1* | 1/2017 | Huddleston ......... G06F 16/2455 |
| 2017/0364703 A1* | 12/2017 | Jacob .................. G06F 21/6227 |

* cited by examiner

| Distance Matrix for Level 3: | min = | 40 MAX = | 50 | | |
|---|---|---|---|---|---|
| | Level 2 Cluster 40 -C | Level 2 Cluster 3 +G | Level 2 Cluster 49 -I | Level 2 Cluster 17 -i | Level 2 Cluster 7 -Pr |
| Level 2 Cluster 40 -Com-Dat+Cus-Bus-Lab+Man+Emp+Ene-Sel | 0 | 47 | 45 | 43 | 45 |
| Level 2 Cluster 3 +GHG-Crt+Bus-Bus | 47 | 0 | 45 | 48 | 48 |
| Level 2 Cluster 49 +Sup+Cus-Lab+Pro+Ene+Pro+Emp+GHG-Dat | 45 | 45 | 0 | 46 | 47 |
| Level 2 Cluster 17 +Lab+Pro-Pro+GHG-Bus+Acc | 43 | 48 | 46 | 0 | 44 |
| Level 2 Cluster 7 -Pro+Pro+GHG-Dat-Bus | 45 | 48 | 47 | 44 | 0 |

FIG. 18

| Distance Matrix for Level 4: | min = | 42 | MAX = | 52 |
|---|---|---|---|---|
| | Level 3 Cluster 10 -C | Level 3 Cluster 9 +Gi | Level 3 Cluster 16 +C | Level 3 Cluster 1 -Pr |
| Level 3 Cluster 10 -Dat-Com+Cus-Bus+Emp+GHG+Ene+Man+Pro-Lab | 0 | 44 | 48 | 46 |
| Level 3 Cluster 9 +GHG-Cri+Bus-Bus | 44 | 0 | 48 | 48 |
| Level 3 Cluster 16 +Cus+Sup-Lab+Pro+Ene+Pro-Air+GHG | 48 | 48 | 0 | 48 |
| Level 3 Cluster 1 -Pro+Pro+GHG-Bus-Dat | 48 | 48 | 48 | 0 |

FIG. 19

SYSTEMS AND METHOD FOR DYNAMICALLY UPDATING MATERIALITY DISTRIBUTIONS AND CLASSIFICATIONS

FIELD

The present disclosure relates to data processing and retrieval to dynamically assess materiality of a signal to an industry or entity.

BACKGROUND

Data science is an inter-disciplinary field that uses scientific methods, processes, algorithms and systems to extract knowledge and insights from many structural and unstructured data. Data science is related to data mining, machine learning and big data.

Data science is a concept to unify statistics, data analysis and their related methods in order to understand and analyze actual phenomena with data. It uses techniques and theories drawn from many fields within the context of mathematics, statistics, computer science, domain knowledge and information science.

SUMMARY

Large data sets exist in various sizes and structures, with the largest data sets today no longer measured in mere terabytes or petabytes. The large volume of data may be collected and stored in a raw, unstructured, and relatively undescriptive format. Data sets this large pose obstacles to indexing, searching, ordering, processing, and digesting in a useful manner.

For example, generating insights from a large unstructured data set can be a resource intensive endeavor. Processing power and storage speeds are often strained to digest data quickly enough to satisfy the end user. To compound the issue, some outputs are useful only in real-time or near-real-time. Generating such outputs in real-time is often resource prohibitive with currently available data structures and processing techniques.

To further compound timing limitations, data analytics, where pattern recognition, categorization, and classification are key to useful insights and objectives, are most useful when the analytical systems have high levels of precision and recall—measures, respectively, of how many selected items are relevant and how many relevant items are selected. It can be challenging to accurately identify what data is relevant to a query and select a result set that excludes irrelevant data in such large sets, even with less constrained time and resources. Resource demands only push higher when analytics systems strive to maintain acceptable levels of recall and precision in real time.

Environmental, Social, and Governance (ESG) signals and other signals can arise in data published by news sources, for example. These signals may then enable the capture of "externalities" that impact public perception, generate costs, and/or generate benefits borne outside an entity such as a company. The externalities may not necessarily be priced into a company's value.

The concept of identifying material ESG information has been steadily gaining steam over the past 7 years, to the point where most investors that are using ESG data believe the idea that some ESG data is more important than other data. However, where most organizations and investors differ is on the definition of what is material. The Sustainability Accounting Standards Board (SASB) has adopted the US Security and Exchange Commission's definition of materiality that only includes financial materiality in order to identify ESG information that matters most to investors. SASB uses this definition of materiality to develop industry-specific standards that are updated every few years.

The Global Reporting Initiative (GRI) uses a definition of materiality that includes information that would be important to all key company stakeholders, which is a far broader interpretation of materiality than SASB, leaving it up to the company to identify what its stakeholders deem important. On top of these two industry frameworks, many asset managers have developed their own proprietary view of what ESG data is material. However, the limitation of these frameworks is that they are not able to dynamically adjust to market conditions in real-time in order to show how issues are emerging as material. Additionally, these frameworks are not able to identify at a company level what ESG issues are material for that specific company.

Various signals may or may not yield materiality of a given industry or entity. Additionally, signals that were immaterial a decade, a year, or a month ago may be material today. Existing approaches to assess materiality involve experts deciding in a static sense which aspects are pertinent based on their knowledge of a company's or industry's business at some time in the past. As stated above, existing approaches tend to overlook higher-paced changes and external factors affecting an industry or company. Decisions related to the company or industry and made based on the existing approach, especially those related to external investment, are rendered less accurate for two reasons 1) materiality is assessed at a speed insufficient to assimilate rapid changes in external conditions, and 2) companies each have their own unique makeup and therefore may not fit neatly into one specific industry designation.

Just as materiality of signals may change with time, entity classifications may evolve as well. Existing entity classification and categorization techniques have shortcomings similar to conventional materiality assessments. Existing classification systems tend to be static and thus inherently inaccurate as time moves forward and entities, industries, and sectors evolve. Classification systems typically do not adapt with agility to newer peers, industries, and sectors for a given entity. Furthermore, existing classification approaches may associate an entity with only one industry and sector even though the entity might be a rightful constituent of many industries or sectors. As a result, more complex relationships may be lost.

To address these shortcoming and other shortcoming, a data analysis system is described. The data analysis system includes a computing cluster ingesting content from a plurality of data sources with the content comprising a plurality of observables relevant to an entity, wherein each observable from the plurality of observables is related to at least one feature of interest from a plurality of features of interest. The system further includes an extraction engine running on the computing cluster and tagging the observables with an entity identifier in response to the observables referencing at least one of an entity, a tradename associated with the entity, or product associated with the entity. Additionally, the system includes an analysis engine running on the computing cluster and tagging an observable from the plurality of observables in response to the feature of interest being related to the observable, wherein the analysis engine measures a materiality of the feature of interest to the entity by counting a number of observables from the plurality of observables tagged with the entity identifier.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

FIGS. 9A and 9B illustrate a sort by degree of correlation as well as summary numbers indicating the degree of non-overlap of the empirically tabulated dynamic materiality distribution with the statically defined materiality map, in accordance with various embodiments;

FIGS. 10 and 11 illustrate the results of clusters formed across the dynamic signatures of pre-classified industries, in accordance with various embodiments;

FIGS. 12 and 13 illustrate a "distance matrix" used in clustering, in accordance with various embodiments;

Figure 16:
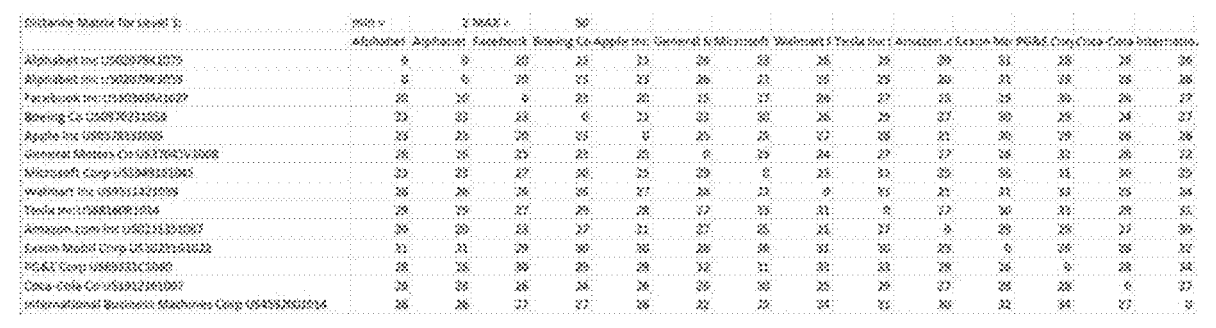
Figure 17:
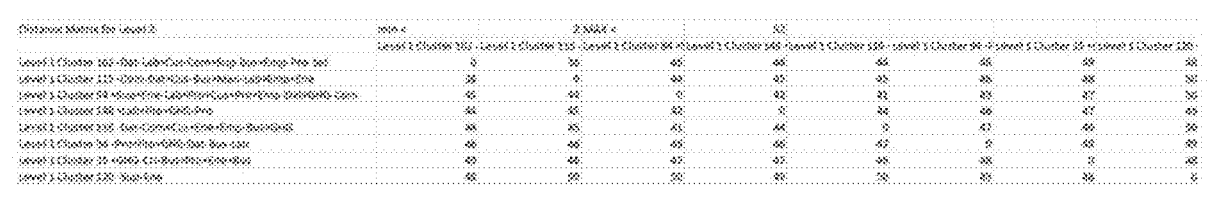

FIGS. 16-20 illustrate distance matrices (close-ups and wider views) used at each level to perform the clustering, in accordance with various embodiments.

DETAILED DESCRIPTION

Figure 1:
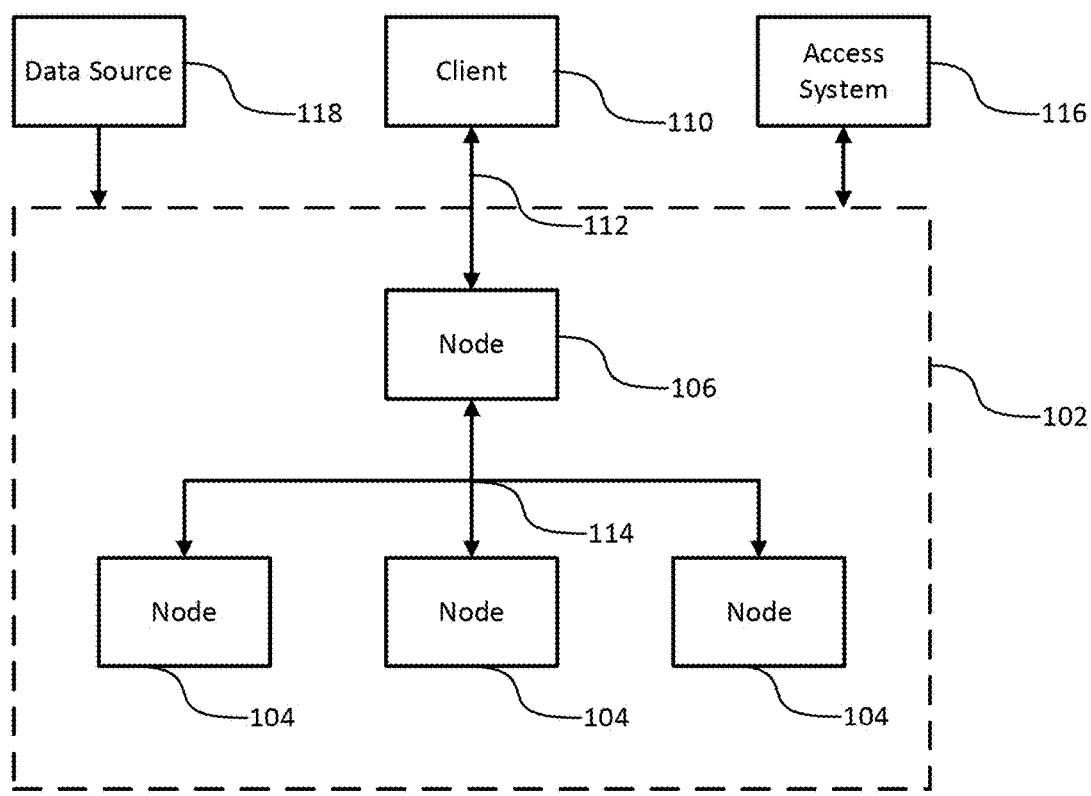
FIG. 1 illustrates an exemplary architecture for ingesting, processing, writing, and reading unstructured data sets, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized, and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Additionally, any reference to without contact (or similar phrases) may also include reduced contact or minimal contact.

Furthermore, any reference to singular includes plural embodiments, and any reference to more than one component may include a singular embodiment. As used herein, the term "unstructured data sets" may refer to partially or fully unstructured or semi-structured data sets including irregular records when compared to a relational database. An unstructured data set may be built to contain observables suitable for natural language processing. Observables for systems and methods of the present disclosure include journal articles, news articles, periodical publications, segments of books, bibliographical data, market data, social media feeds, converted videos, or other publications relevant to an entity or group of entities. An unstructured data set may be compiled with or without descriptive metadata such as column types, counts, percentiles, custom scoring and/or other interpretive-aid data points.

As used herein, the term "entity" may describe corporate entities, asset classes, municipalities, sovereign regions, brands, countries, geographic locations, recursively groups of entities (such as industries or sectors themselves) or other items related to or referenced by text, video, or audio content. The term "categorization" may refer to the action by which the systems and methods described herein classify an entity. The term "signal" may refer to a topic or criteria on which the systems and methods described herein evaluate an entity. For example, systems and methods described herein may negatively score a corporation's data security signal based on news coverage of a data breach event where the corporate entity exposed personally identifiable information. In that regard, systems and methods of the present disclosure may assess and quantify Environmental, Social, and Governance (ESG) signals (or other signals derivable from content of interest) related to entities of interest.

As used herein, the term "real-time" may refer to a time period ranging from instantaneous to nearly instantaneous. For example, real-time results may include results served within a fraction of a second, within 5 seconds, within 10 seconds, or even under a minute in certain contexts.

With reference to FIG. 1, a distributed file system (DFS) 100 is shown, in accordance with various embodiments. DFS 100 comprises a distributed computing cluster 102 configured for parallel processing and storage. Distributed computing cluster 102 may comprise a plurality of nodes 104 in electronic communication with the other nodes, as well as a node 106 that may be configured as a control node. Processing tasks may be split among the nodes of distributed computing cluster 102 to improve throughput and enhance storage capacity, with each node capable of indexing data stored on its local resources. Distributed computing cluster 102 may leverage computing resources and software tools of modern data centers such as those offered by Amazon Web Services (AWS) or Microsoft Azure, for example. Distributed computing cluster 102 may also be a stand-alone computing array with some of nodes 104 comprising a distributed storage system and some of nodes 104 comprising a distributed processing system.

In various embodiments, nodes 104, node 106, and client 110 may comprise any devices capable of receiving and/or processing an electronic message via network 112 and/or network 114. Client 110 may further comprise a graphical user interface or portal to the various nodes or data of the system. For example, nodes 104, node 106, or client 110 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, smart wearables, or any other device capable of receiving data over the network.

In various embodiments, client 110 may submit requests to node 106. Node 106 may distribute the tasks among nodes 104 for processing to complete the job intelligently. Node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be a local area network using TCP/IP communication or a wide area network using communication over the Internet. Nodes 104 and node 106 may similarly be in communication with one another over network 114. Network 114 may be an internal network isolated from the Internet and client 110, or, network 114 may comprise an external connection to enable direct electronic communication with client 110 and the internet.

In various embodiments, data may be ingested and processed to generate outputs from inputs. In that regard, input variables may be mapped to output variables by applying data transformations to the input variables and intermediate variables generated from the input values. Nodes 104 may process the data in parallel to expedite processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104 for batch processing. Each node 104 may then process the stream of 1,000 records while maintaining the resultant data in memory until the batch is complete for batch processing jobs. The results may be written, augmented, logged, and written to disk for subsequent retrieval. The results may be written to disks using various unstructured data storage formats.

In various embodiments, an access system 116 may be in electronic communication with distributed computing cluster 102 to facilitate access and retrieval of data in distributed computing cluster 102. Access system 116 may comprise, for example, a web server hosting a web interface for users to selectively engage with data stored in distributed computing cluster 102. The access system 116 may thus be capable of receiving and responding to HTTP requests from web browsers relating to authentication, user profiles, custom data filtering, custom data scoring, and otherwise interacting with web browsers. Access system 116 may also interact with a native application suitable for running on laptops, smartphones, personal computers, or other computing devices suitable for retrieving, displaying, manipulating, and sending data.

In various embodiments, data sources 118 may be in communication with distributed computing cluster 102 for data ingestion. Data sources 118 may include targeted sources, aggregated sources, web-crawled sources, known reputable sources, or other sources suitable for ingestion into an unstructured data system. Data sources 118 may be a curated list of sources taking into consideration a white list of selected feeds, a blacklist of excluded feeds, or otherwise applying a criterion to selectively exclude data from ingestion and enhance the reliability of the ingested data.

Figure 2:
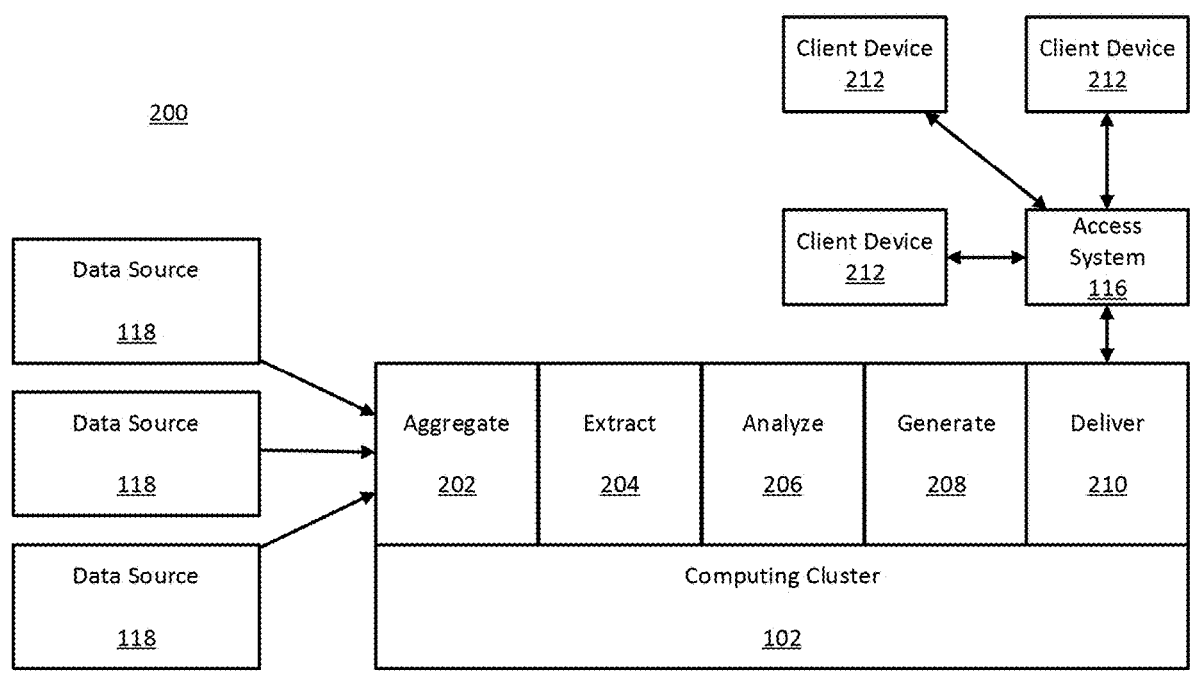
FIG. 2 illustrates an exemplary data flow ingesting text and/or image (still and moving) data from various news outlets, article sources, and content sources to support sentiment scoring and other predictive analytics for entities, in accordance with various embodiments.

With reference to FIG. 2, data processing architecture 200 is shown for ingesting text, video, and audio information related to entities from news outlets, trade journals, social media, watchdogs, nongovernmental organizations, and other content sources to support sentiment scoring and predictive analytics related to signals or categories.

In various embodiments, data sources 118 may feed into distributed computing cluster 102 running an aggregation engine 202. Aggregation engine 202 may compile and preprocess data received electronically from various types of data sources. Aggregate engine 202 may accept data from targeted sources, aggregated data from aggregate sources, targeted web crawling from selected internet sources, RSS feeds, flat files, CSV files, JSON files, XML files, data backups, or other data sources capable of conveying text, audio, or video content related to entities. For example, aggregate engine 202 may accept text articles from a news aggregator or news outlet.

In various embodiments, content compiled by aggregation engine 202 may feed into extraction engine 204. Extraction engine 204 may sift through content by removing structure, converting audio and video to text, and otherwise eliminating unsuitable or undesirable content from data feeds. Extraction engine 204 may remove content by identifying undesirable patterns, structures, or content types such as, for example, raw data tables, images, unsupported languages, excluded terminology, resumes, forms, suggestive titles, excessive length, duplicative text, or stock reports. Extraction engine 204 may thus apply predefined criteria to content to exclude unreliable, inaccurate, unwanted, or disreputable sources. Extraction engine 204 may process the selected content to detect entities, detect signals, and score signal sentiment, which extraction engine 204 may tag for future retrieval and processing. The various engine described herein may be modifiable by a user selection through a graphical user interface (GUI) based on inputs form a user.

In various embodiments, analysis engine 206 may further operate on the content, detected entities, detected signals, and signal scores generated by extraction engine 204. Analysis engine 206 may parse content to detect events and identify key, measure density, perform salience clustering, and assess volatility and confidence. For example, analysis engine 206 may identify that an oil spill occurred at Deepwater Horizon with news stories breaking starting Apr. 20, 2010, and analysis engine 206 may tag content covering the spills with an event identification to facilitate retrieval and analysis of articles associated with the event. Analysis engine 206 may also parse content and assess materiality of signals by applying a materiality framework such as the materiality framework endorsed by the Sustainability Accounting Standards Board (SASB) and described at https://www.sasb.org/standards-overview/materiality-map/. Systems and methods of the present disclosure may also apply other suitable frameworks such as, for example the Global Industry Classification Standard (GICS) classification system. In that regard, analysis engine 206 may weight signals related to an entity based on the materiality of a particular signal to the market segment or industry in which the entity operates.

In various embodiments, generation engine 208 of data processing architecture 200 may generate entity scorecards, entity trends, portfolio monitoring, investment opportunities, and alpha in response to the data processed by extraction engine 204 and analysis engine 206. Content and metadata may pass from extraction engine 204 and analysis engine 206 as inputs into analysis engine 206 in response to passing filter checks and meeting a threshold selected to balance recall (how much relevant content is selected) with precision (how much of selected content is relevant). Inaccurate or unreliable data may be filtered or omitted from the dataset based on the filters and processing steps in extraction engine 204 and analysis engine 206.

In various embodiments, the data generated by extraction engine 204, analysis engine 206, and generation engine 208 may be suitable for end user consumption. Delivery engine 210 may thus package the data and content in a format suitable for consumption by an end user. For example, an end user operating client device 212 with a graphical user interface (GUI) in electronic communication with access system 116 may request content packaged by delivery engine 210 for display locally on client device 212. In that regard, client device 212 may run a web browser in communication with a web server running on access system 116 and hosting the information packaged by delivery engine 210.

Figure 3:
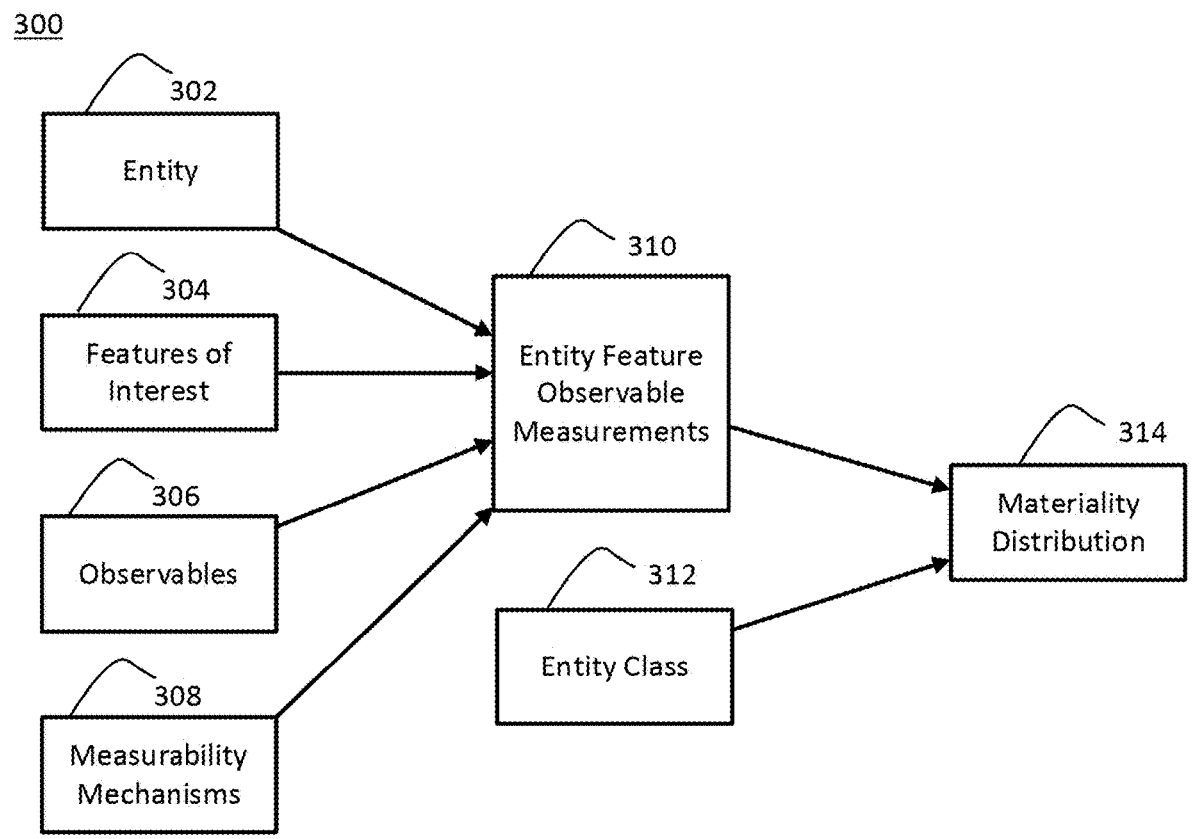
FIG. 3 illustrates an exemplary process for dynamically assessing materiality of features to an entity or group of entities, in accordance with various embodiments.

Referring now to FIG. 3, a process 300 for dynamically assessing materiality is shown, in accordance with various embodiments. Process 300 may run on distributed computing cluster 102 using data processing architecture 200 or a similar distributed computing infrastructure.

In various embodiments, distributed computing cluster 102 may select or otherwise identify an entity 302. Entity 302 may be an organization selected from a collection of organizations. For example, distributed computing cluster 102 may select entity 302 in response to entity 302 being a publicly traded company subject to incoming media referencing entity 302.

In various embodiments, distributed computing cluster 102 may identify or select features of interest 304. Features of interest 304 may be selected in response to being standardized areas or points of evaluation, behavioral observations, organizationally structural observations, categories of observations in corporate environmental stewardship, social impact, governance, and the like.

In various embodiments, distributed computing cluster 102 may identify or select observables 306 relevant to entity 302 and/or other entities from the collection at that point in time to be observed such as, for example, textual news articles, reports, still images, video images, and/or other observations. Observables 306 may be recordable on retrievable media, suitable for electronic communication across a network such as, for example, network 112 or network 114 of FIG. 1. Observables 306 may also arrive through natural input channels at aggregate engine 202 of FIG. 2.

In various embodiments, distributed computing cluster 102 may select or identify measurability mechanisms 308. Measurability mechanisms 308 may be known mechanisms to ascertain salient quantitative measurements from observables 306 related to the features of interest 304. Measurability mechanisms 308 may include, but are not limited to, applying known techniques for ascertaining the sentiment polarity and level articulated by a textual observable with respect to a feature of an entity. One example is the description of the degree of greenhouse gasses emitted from the operations of a company, netting a negative polarity, with a relative quantitative assessment of level based upon the linguistic superlatives used to describe the gas emission. Another example is the description of percentage of water sourced in company operations from regions with high water stress, netting a positive polarity, with a relative quantitative assessment of level based on linguistic descriptions of improvement relative to a previous period. Yet another example is the description of a labor negotiation, netting a negative polarity, with a relative quantitative assessment of level based on negative linguistic descriptions used to describe the likelihood of a work stoppage.

In various embodiments, distributed computing cluster 102 may apply methods such as natural language processing and image processing/visual feature characterization, apply the measurability mechanisms 308 to the observables 306 of entity 302 with respect to the features of interest 304 to produce the entity-feature-observable measurements 310.

In various embodiments, distributed computing cluster 102 may identify or otherwise retrieve entity class 312. Entity class 312 may be extracted from a classification system of entities, such as industry or sector classifications for companies. Distributed computing cluster 102 may tabulate the resulting entity-feature-observable measurements 310 corresponding to entity class 312 for each of the features of interest 304. Tabulations may include counting the existence of scores, averaging the scores, applying multidimensional clustering, and/or applying other statistical analysis techniques.

In various embodiments, dynamic materiality distributions 314 may coalesce over time as characterized by the tabulations, which may result in comparable numerical characterizations of magnitudes, significance, importance and the like of features of interest 304 within entity class 312. Process 300 may be repeated for various entity classes 312 and various entities 302 to assess a collection of entities. The result may comprise an articulation of dynamic materiality as a function of time. The dynamic materiality may then be updated as frequently as new observables appear in the input channels and is described below in greater detail with reference to FIG. 4.

Continuing with FIG. 3, a clustering of entities based on measurements upon observables 306 related to features of interest 304 may be made in a multidimensional space with each dimension representing one of the features of interest 304, in accordance with various embodiments. Each entity may be represented by a vector in the multidimensional space. Vectors in the multidimensional space may comprise magnitude such as a volume count of measurements upon observables related to features of interest 304 or entity classes 312. Clustered observables may be used to detect new entity classes that collect similar entities better than conventional classification systems and hierarchies. The new entity classes may also be characterized as combinations of the originally-input features of interest 304. Techniques to derive new entity classes or other insights may include agglomerative clustering, Euclidean clustering, principal component analysis and other clustering and re-categorizing techniques.

In various embodiments, techniques for dynamically assessing materiality may include tabulating volume of news related to an entity across categories and/or uniquely evaluating an entity across categories by news volume to create an entity signature. The entity signature may be used to identify similarities and/or differences between entities, or between the same entity at different points in time. A distance matrix may be created to be applied to agglomerative clustering, for example. A Euclidean cluster may also be created for the space with each dimension representing one of the features of interest 304. The results may be used in self-assessment to measure overlap with existing approaches and differences with existing approaches.

In various embodiments, techniques for dynamically assessing materiality may include consideration of company size or value as measured by number of employees, market capitalization, enterprise value, or other measurements. Dynamic materiality calculations and assessment might change in circumstances including, but not limited to, if a company is predicted or expected using size or valuation measurements to have insufficient volume to render the primary dynamic materiality calculation and assessment meaningful. Other useful applications of the comparison between company or entity volume and measurements of company or entity size or value may exist, and this concept may be extended recursively to industries, sectors, or other clusters.

In various embodiments, techniques for dynamically assessing materiality may include tabulating volume of news related to an entity across categories. Dynamic materiality assessments may comprise relative measurements of categories to each other for one company or entity, industry, sector, or other suitable grouping.

In various embodiments, techniques for dynamically assessing materiality may include tabulating volume of news related to an entity and one category and comparing that entity-category combination's news volume to the total news volume related to that category across entities. This concept may also be used for assessing core materiality, and may be extended recursively to industries, sectors, or other clusters for both dynamic materiality assessments and core materiality assessments.

In various embodiments, observables 306 may comprise news articles or other content that are analyzed by distributed computing cluster 102 to isolate textual passages concerning entity 302 with regard to a particular feature of interest 304. Distributed computing cluster 102 may analyze the isolated textual passage for a degree (i.e., magnitude) and polarity (positive or negative) of sentiment to produce a sentiment measurement. The sentiment score may be numerically comparable to similar sentiment measurements generated for other entities with respect to the same feature of interest 304. The numerical degree and polarity of the sentiment may be determined using natural language processing techniques to identify text relating to entity 302, feature of interest 304, and ranked words (e.g., where superlatives have greater weight than neutral terms), which may be processed algorithmically using techniques to determine the numerical characterization.

In various embodiments, suitable processing techniques may include, for example, lexicon-based algorithms, and learning-based algorithms. More generally, approaches to sentiment analysis can be grouped into three main categories: knowledge-based techniques, statistical methods, and hybrid approaches. Knowledge-based techniques may classify text by affect categories based on the presence of unambiguous affect words such as happy, sad, afraid, and bored. Some knowledge bases may not only list obvious affect words, but also assign arbitrary words a probable "affinity" to particular emotions. Statistical methods may leverage elements from machine learning such as latent semantic analysis, support vector machines, "bag of words", "Pointwise Mutual Information" for Semantic Orientation, and deep learning. Machine training may thus then be applied using known data segments, textual, or otherwise, to steer the learning system to efficiently capture, categorize, and evaluate such signals with respect to entities of interest found within incoming data streams such as those from news sources.

In various embodiments, more sophisticated methods may be leveraged to detect the holder of a sentiment (i.e., the person who maintains that affective state) and the target (i.e., the entity about which the affect is felt). To mine the opinion in context and get the feature about which the speaker has opined, the grammatical relationships of words may be used. Grammatical dependency relations are obtained by deep parsing of the text. Hybrid approaches may leverage both machine learning and elements from knowledge representation such as ontologies and semantic networks in order to detect semantics that are expressed in a subtle manner, e.g., through the analysis of concepts that do not explicitly convey relevant information but are implicitly linked to other concepts that do. Results of these analyses may be converted into a score that characterizes the observable 306 (e.g., the news article) with regard to the feature of interest 304 being observed relative to entity 302.

In various embodiments, observables 306 may comprise images including still images, moving images, satellite images, or ground-based images. Distributed computing cluster 102 may sift images to isolate known visual features concerning a particular entity with regard to a feature of interest 304. Examples of observables 306 (e.g., images) may include smokestacks with observable levels of pollution being expelled over time as a visual indicator of a feature of interest 304 (e.g., air pollution). Distributed computing cluster 102 may analyze an image for a degree and polarity of sentiment, numerically comparable to such sentiment measurements made upon other entities with respect to the same feature of interest 304. The numerical degree and polarity of sentiment may be determined using image processing techniques to identify objects within the image relating to entity 302 and/or feature of interest 304. Known machine learning image processing techniques may include "Region-Based Convolutional Neural Networks" or "You Only Look Once" algorithms applied for object detection, image classification, object localization, object detection, and object segmentation.

In various embodiments, distributed computing cluster 102 may process entity 302 and/or feature of interest 304 algorithmically as described above to determine the characterization within known tabulations of detected objects and their measurable sentiment relative to the feature of interest. Results may be converted into a score that characterizes the observable 306 (e.g., the image) with regard to the feature of interest 304 (e.g., air pollution) being observed relative to entity 302.

In various embodiments, the dynamic materiality distribution for each entity 302 from a collection of entities may constitute a signature for each entity 302 based upon its empirically determined dynamic materiality distribution. For example, the levels of observed attention upon the features of interest 304 of an entity (with all features of interest 304 being common across entities) can be sequenced by magnitude or importance (e.g., the amount of news about a particular feature of interest 304 of a company such as employee satisfaction relative to the amount of news about other features of interest 304).

In various embodiments, ordering or sequencing may result in a dynamic signature for the entity. The dynamic signature may be used to affinitize entity 302 with other entities having similar signatures. Boundaries of similarity may be used to create clusters, and clusters themselves may be assigned dynamic signatures based upon their constituents. Similar clustering and signature assignment may be applied at various levels of hierarchy. In that regard, entities may be dynamically clustered using the above techniques. The constituents within industries or sectors may thus change in response to either the dynamic signature of the sector or industry changing or the dynamic signature of constituent entities changing.

In various embodiments, distributed computing cluster 102 may cluster and assign signatures to the clusters generated to produce an empirical classification system. Distributed computing cluster 102 may affinitize signatures using metric and clustering techniques such as Levenshtein Distance agglomerative clustering applied to the order of the features of interest 304 in the signature, or such as multi-dimensional clustering applied to the magnitude observed for each feature of interest 304 as independent axes in a high-dimensional space.

In various embodiments, magnitudes or importance may be polarized to identify additional distinguishing possibilities as positive or negative behavior with respect to the set of common features of interest 304 being observed. For example, entity 302 may be a fossil fuel company with a large quantity of observables 306 relating to a feature of interest 304 in the form of greenhouse gas emissions, yet the attention would be construed as negative. Continuing the example, another entity 302 may be a solar energy company with a large quantity of observables 306 viewed as mitigation to greenhouse gas emissions (feature of interest 304), and the attention would be construed as positive. Polarization may thus enrich the clustering space, distinguishing positive and negative entity behavior.

In various embodiments, classifications may be updated in real-time, hourly, daily, weekly, monthly, annually, irregularly, or on any desired update frequency. Similarly, classifications may be calculated continually and updated in response to a magnitude of change in the components of the vector describing a classification exceeding a threshold value. Observations may also be made regarding shifts in the constituents (e.g., entities 302 from a collection of entities) as being signals of changing emphasis of the features of interest 304 of entities. For example, distributed computing cluster 102 may identify increasing or decreasing attention to features of interest 304 over time signaling changes in behavior.

In various embodiments, distributed computing cluster 102 may similarity map dynamic materiality classifications to conventional classifications for comparison and calibration. These mappings can be established by first ascertaining the dynamic signatures of the groupings within conventional systems (such as industries within SASB Sustainable Industry Classification System [SICS] or within other conventional classification systems which characterize industries and sectors) by mathematically aggregating the signatures of the constituents of each grouping to a signature representing the grouping. Then from the pool of signatures within the dynamic materiality classification system, those best approximating the conventional group signatures would be found, thus linking the two classification systems. Alternatively, a grouping within one system can be sought that overlaps in constituents with that of the other system. Performing this across all groups would then create a mapping between the two classification systems. Such mappings then establish an informative relationship between conventional systems and dynamic materiality-based systems.

In various embodiments, generating similarity mappings between clusters with signatures may include computing a similarity metric between two clusters. The similarity metric may include, for example, a weighted sum or product of the constituent overlap extent between the two clusters and the similarity metric of the signatures themselves (e.g., Levenshtein distance or other known metric between strings). The resulting combined similarity metric may be applied between all clusters in the collection to produce a similarity matrix, with clusters from one classification system along one axis and clusters from the other classification system along the second axis. An optimal, lowest-cost path from the top row to the bottom row through the matrix (touching each row and each column only once) may correspond to the optimal mapping between the two classification systems.

In various embodiments, distributed computing cluster 102 may apply clustering and similarity techniques to finding affinity between entities, or clustered collections of entities, with predefined areas of interest also characterized by pre-setting the materiality signatures and distributions that best describe the entities or clustered collections of entities. For example, distributed computing cluster 102 may start with a predefined materiality signature or distribution, relatively weighing features related to the environment to describe the concerns about climate change. The dynamic signatures identified using process 300 for various entities may be similarity tested with those of the climate change "ideal" as a measure of best adherence to climate concerns.

Figure 4:
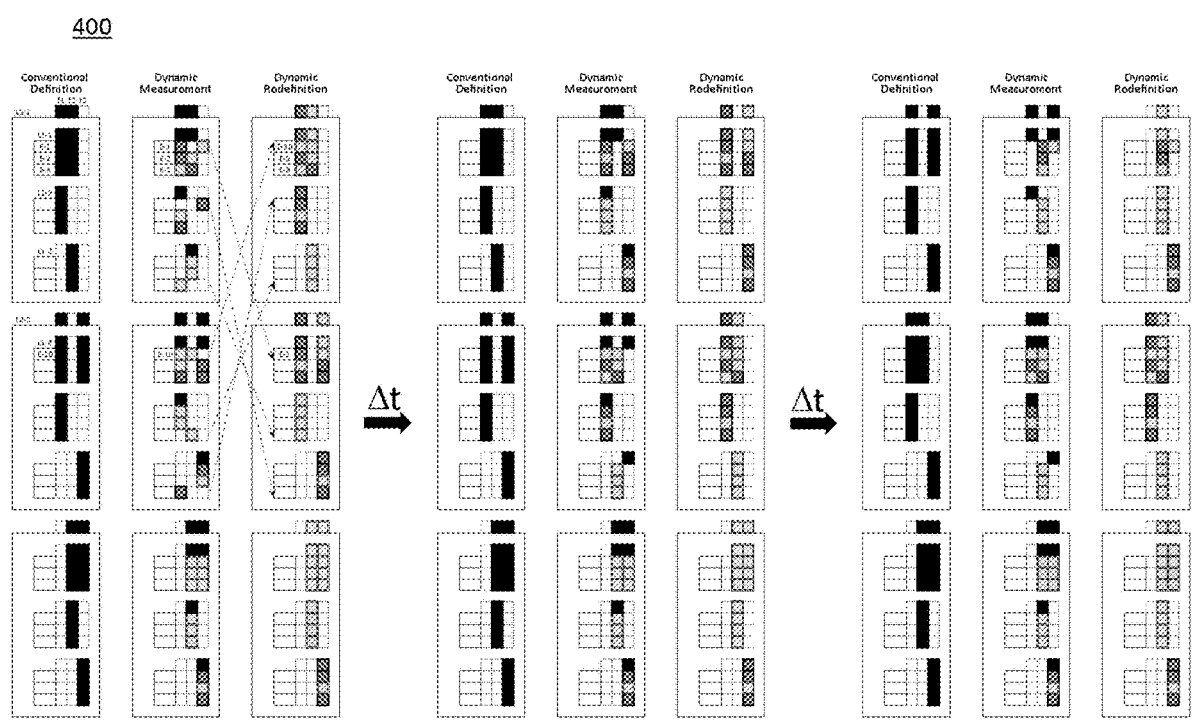
FIG. 4 illustrates an exemplary progression from an original static materiality framework to a dynamically adapted materiality framework, in accordance with various embodiments.

Referring now to FIG. 4, a schematic 400 is shown depicting differentials between conventional materiality and classifications contrasted with those produced by dynamic measurements changing through time. Dynamic measurements and classifications tend to lead conventional frameworks over time in terms of changes and accuracy. Dynamic classifications and measurements may thus indicate possible future changes to the composition of the conventional framework. In that regard, schematic 400 may be described as a depiction of embodiments described herein.

In various embodiments, the larger rectangles labeled L2 (e.g., L2-1 and L2-2 up to L2-N for any desired number N of groupings) may represent higher level groupings or clusters such as, for example, sectors containing industries. The smaller groupings or clusters labeled L1 (e.g., L1-1, L1-2, L1-3, L1-4 up to L1-N for any desired number N of groupings) within the larger rectangles labeled L2 may represent more granular groupings or clusters such as, for example, industries or peer groupings within a sector. Atomic entities labeled E (e.g., E1, E2, E3 up to EN for any desired number N of entities) may be grouped together in the smaller groupings labeled L1. Atomic entities may be entities described herein such as, for example, firms, companies, nonprofits, organizations, or other individual entities.

In various embodiments, features of interest 304 (from FIG. 3) may be assessed with respect to each level of grouping (e.g., sector, industry, entity). Although three features of interest 304 have been selected for sake of example (f1, f2, and f3), any desired number of features may be assessed and evaluated for dynamic materiality distribution, dynamic signatures, and/or dynamic classification.

In various embodiments, graphical fill levels in the squares where the two dimensions intersect indicate materiality. Conventional materiality is represented in solid black, and dynamic materiality is represented in shades of gray depicting the intensity of news or other references relevant to an entity, industry, or sector.

In various embodiments, each time block contains three columns entitled "Conventional Definition", "Dynamic Measurement", and "Dynamic Redefinition." Conventional Definition represents conventional materiality definitions and classifications (such as GICS, SICS, etc.). Dynamic Measurement represents the dynamic materiality readings found for each entity across all the features. Such readings then lead to more fitting combinations and groupings of the entities per the empirical material distributions and signatures found. Entities and groupings can be adjusted in response to the material distributions and signatures in the form of reassigning entities to groups of entities with similar signatures.

In various embodiments, dynamic materiality distributions and signatures may be measured at any desired cadence. The updates may be observed to identify differences between previously generated dynamic materiality distributions and signatures and current dynamic materiality distributions and signatures. The updates may also be observed to identify differences between current dynamic materiality distributions and signatures and prevailing conventional definitions in force at the time of the reading (e.g., SASB, SICS).

In various embodiments, observation over time may show that dynamic materiality distributions and signatures serve as leading indicators for changes to conventional definitions over time. In FIG. 4, the change over time is illustrated in the materiality distribution shown in the new Conventional Definition column in the third time block, which has changed to reflect the previous Dynamic Redefinition. Real world examples of this phenomenon include the rise of climate concerns to prominence as core conventional materiality evolved in recent times.

Figure 5:
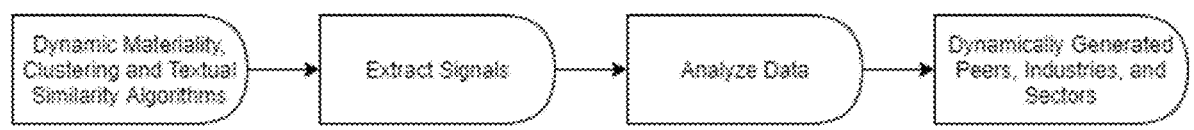
FIG. 5 illustrates an exemplary data processing architecture for dynamic signature generation and dynamic categorization, in accordance with various embodiments.

Referring now to FIG. 5, data processing architecture 500 is shown for extracting and analyzing signals in dynamic and textual materiality to dynamically identify peers and otherwise categorize entities into industries and sectors using distributed computing cluster 102, in accordance with various embodiments. The data processing architecture 500 may take dynamic materiality and dynamic similarity as inputs and extract signals. The signals may be analyzed as described above to evaluate entities. Results may include continuously updated ontology graph relationship between companies, peer groups, industries, and sectors. Entities may be classified into more than one peer group, industry, and sector at the same time if appropriate. Data processing architecture 500 may be scalable and objective. Evaluating materiality from signals allows a holistic assessment of companies that incorporates public perception, which can move markets.

In various embodiments, data processing architecture 500 may be used in a variety of business use cases to solve various problems. For example, a classification system analyst may use data processing architecture 500 to better inform them on re-classifying or classifying a new company into a peer group, industry, or sector in a traditional framework to achieve a more accurate classification system. An automated trading system engineer may use this system in the market-making pricing engines on exchanges to better understand correlations and relationships between companies, peer groups, industries, and sectors. A researcher may use this system to better write research on relevant peer groups and understanding the ontology of relationships between peer groups, industries, and sectors. These techniques may also be applied to domains outside business, finance, and investing to any classification problem more generally in instances, for example, when trying to classify geopolitical events or groups together.

Figure 6A:
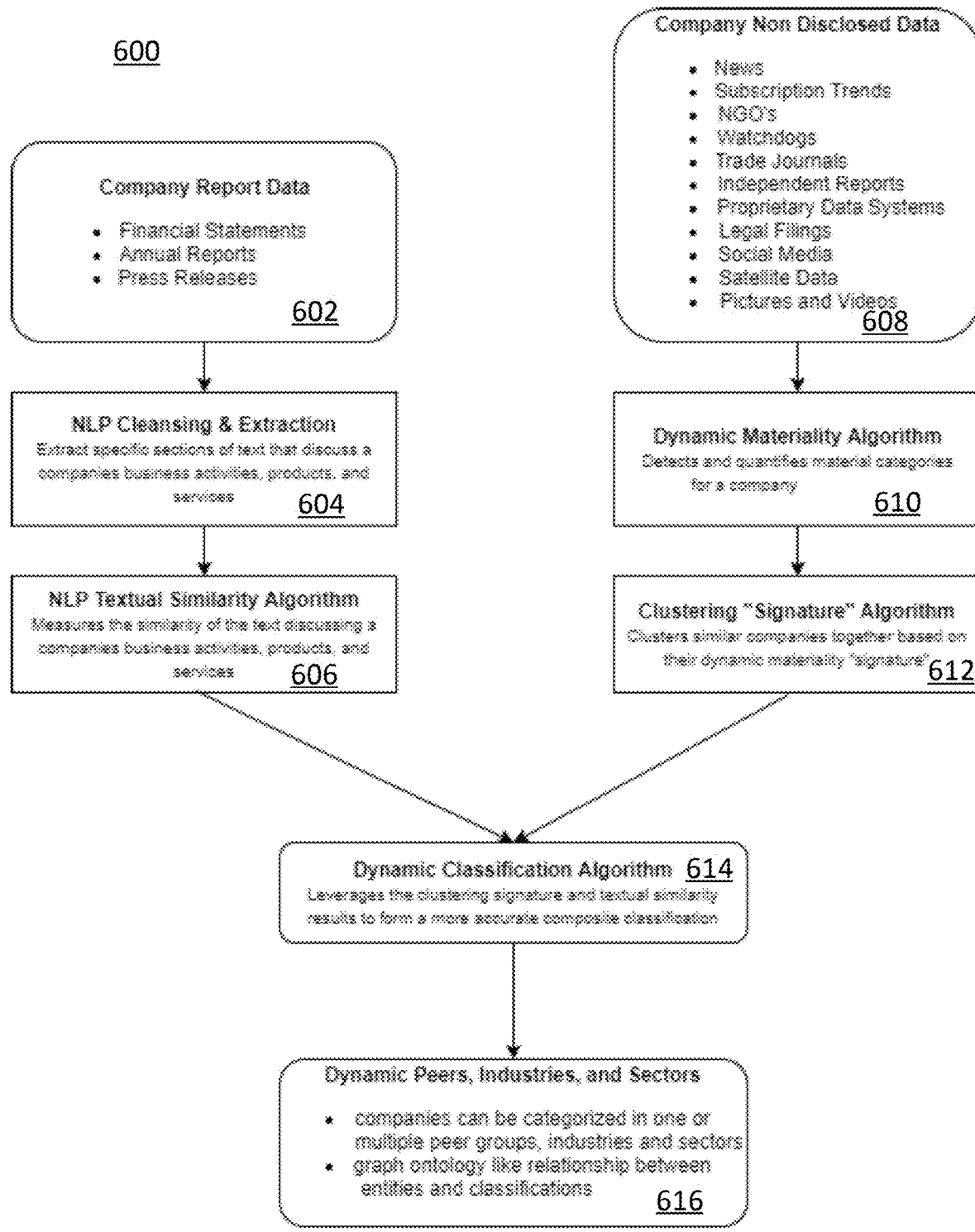
FIG. 6A illustrates an exemplary process for ingesting entity-reported data and non-entity-reported data to generate signatures for and categorize entities, in accordance with various embodiments.

Referring now to FIG. 6A, process 600 is shown for ingesting entity-reported data and non-entity-reported data to dynamically classify or categorize an entity, in accordance with various embodiments. Process 600 may run on distributed computing cluster 102 to generate signatures based on unstructured data with textured similarity on structured data (e.g., company-reported data).

In various embodiments, process 600 may ingest company-reported data in step 602. Company-reported data may be cleaned and extracted in step 604, and company reported data may also be processed to identify textual similarities. Process 600 may thus comprise multiple steps in processing company reported data. For example, process 600 may extract business activities, products, and services related to an entity or company in step 604. Process 600 may then find entities or companies with similar signatures in step 606 based at least in part on the business activities, products, and services extracted in step 604. Process 600 may thus identify similar entities by evaluating similarities in limited and particularly selected portions of company-reported text.

In various embodiments, process 600 may also ingest non-company-reported data in step 608. Non-company-reported data may be in the form of observables relating to features of interest as described above (with reference to FIGS. 3-5, for example). Process 600 may assess dynamic signatures for entities in step 610 (using techniques described above with reference to FIGS. 3-5, for example). Process 600 may also cluster entities in step 612 based on their dynamic signatures.

In various embodiments, process 600 may use textual similarity and the clustering signature to form a more accurate composite classification in step 614. The composite classification may thus be based on either or both company-reported data (e.g., information on 10 k or 990 forms) and non-company-reported data (e.g., media coverage). By using the combination of company-reported and non-company-reported data, distributed computing cluster 102 may generate a more reliable dynamic classification signal.

In various embodiments, the signal may be used to dynamically cluster or categorize entities, industries, and/or sectors in step 616. Using the dynamic signature in conjunction with textual similarity of an entity may result in increased accuracy. Textual similarity may be particularly relevant when relating to an entity's activities, products, services, actions, etc. In that regard, text unrelated an entity's activities, products, services, and/or actions may be ignored when parsing company-reported data in process 600 to identify textual similarities.

In various embodiments, process 600 may identify synonyms and match phrases with similar meanings. Process 600 may thus match entities with similar activities, products, and services extracted from unstructured text that uses the synonyms or differing phrases that would otherwise not be an exact match. Process 600 may refer to a synonym dictionary to match synonyms and phrases with similar meanings. For example, process 600 may detect a first company referencing "electric vehicles" and second company referencing "EVs." Process 600 would identify that EV is a synonym for electric vehicles and thus identify the similarity between two companies selling the same product but under a different name.

In various embodiments, some subset of the same signals that express unique dynamic material signatures of a company entity, industry, sector, or other cluster, may exhibit an outsized and enduring contribution to total signal volume across companies or entities, such that these signals are regarded as core material signals among the total set of signals. This introduces the concept of "core materiality" in accompaniment with dynamic materiality.

In various embodiments, methods of detecting similarity or semantic affinity between companies (such as product similarity, service similarity, similarities in lines of business, etc.) may be expanded beyond textual similarity to include additional natural language similarity detection techniques such as, for example, lexicon-based algorithms (with lexicons constructed to articulate known business areas), synonym dictionaries, learning-based algorithms, latent semantic analysis, support vector machines, "bag of words", "Pointwise Mutual Information" for Semantic Orientation, and deep learning.

For example, in section 1 of a 10 k report companies describe their business. Comparing textual similarities of entities' self-described businesses, along with the dynamic signature of the entities, would likely increase confidence in the relationship between two entities. Although 10 k reports are used as a commonly known example, other mandatory reports, optional reports, press releases, or other self-published information from an entity may be used for comparison with other entities.

Figure 6B:
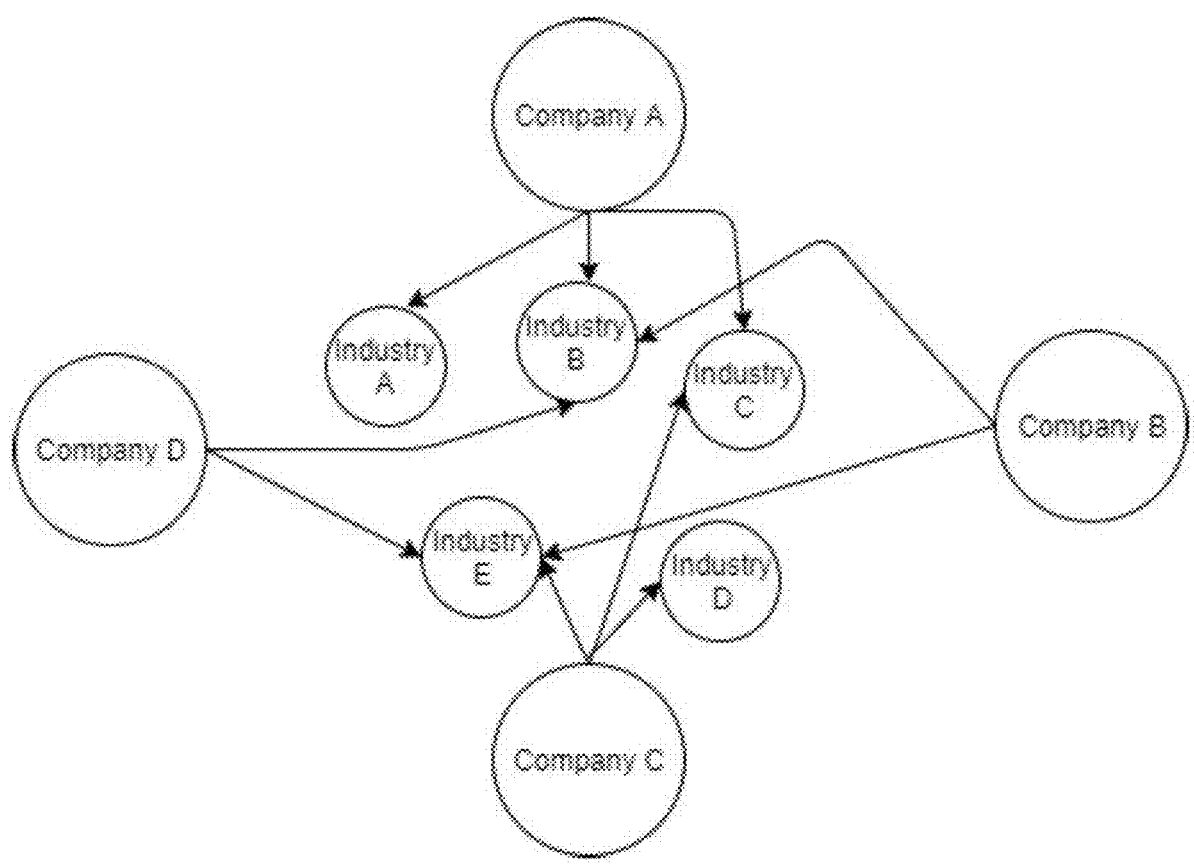
FIG. 6B illustrates an exemplary ontology generated by from dynamically categorizing entities, in accordance with various embodiments.

In various embodiments, separate signatures may be generated with a first signature based on company-reported data and a second signature based on non-company-reported data. Distributed computing cluster 102 may compare the two signatures to measure how close a company's reported data reflects its actions as manifested in non-company-reported data. FIG. 6B depicts ontology 620 of dynamically generated relationships, which may include complex relationships between entities discovered as a result of process 600 of FIG. 6A.

Figure 7A:
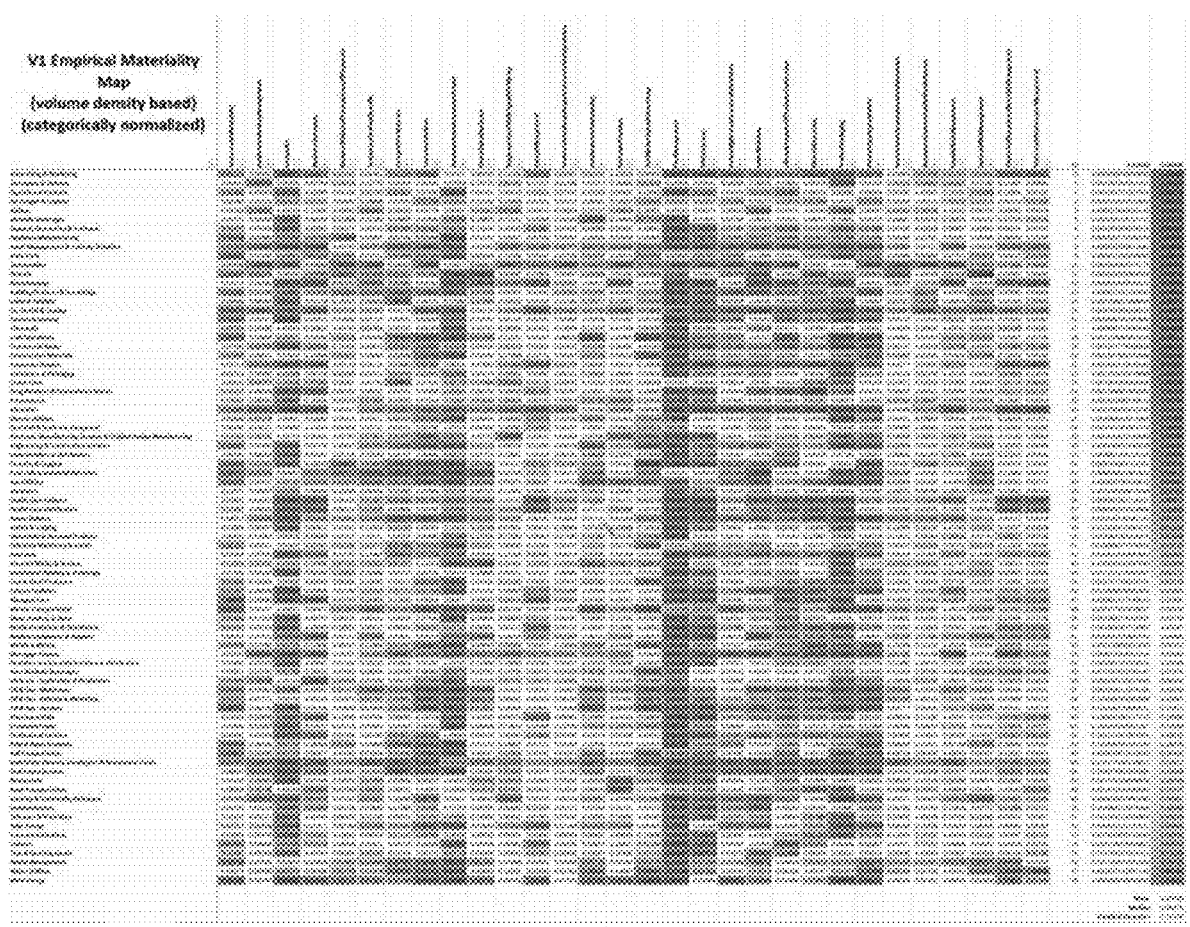
FIG. 7A illustrates a normalized relative volume tabulation for entity classes along the vertical axis versus the features of interest across the horizontal axis, in accordance with various embodiments.
Figure 7B:
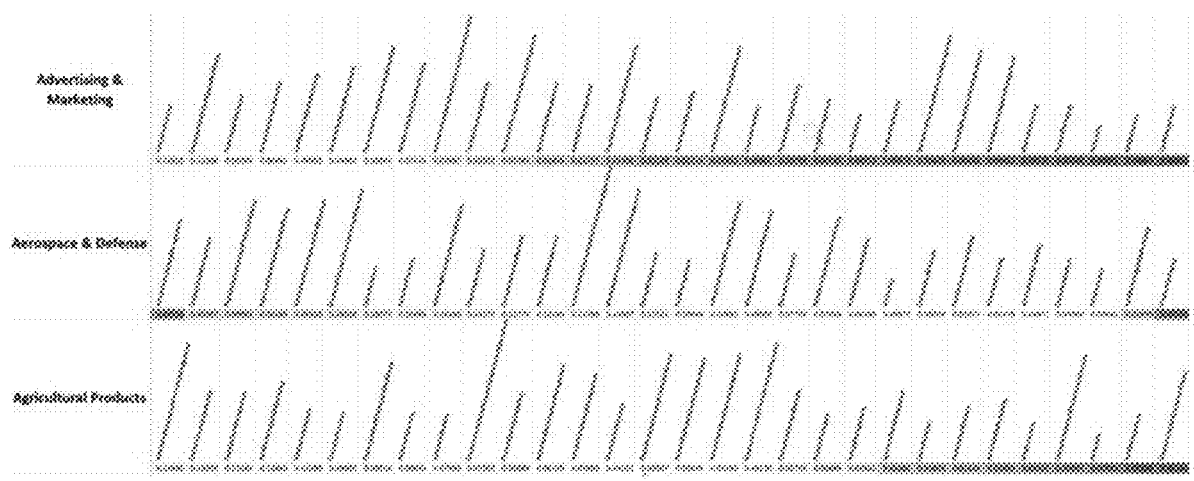
FIGS. 7B and 7C illustrate a spectral sorting of the features of interest by volume metric for each entity class, in accordance with various embodiments.
Figure 7C:
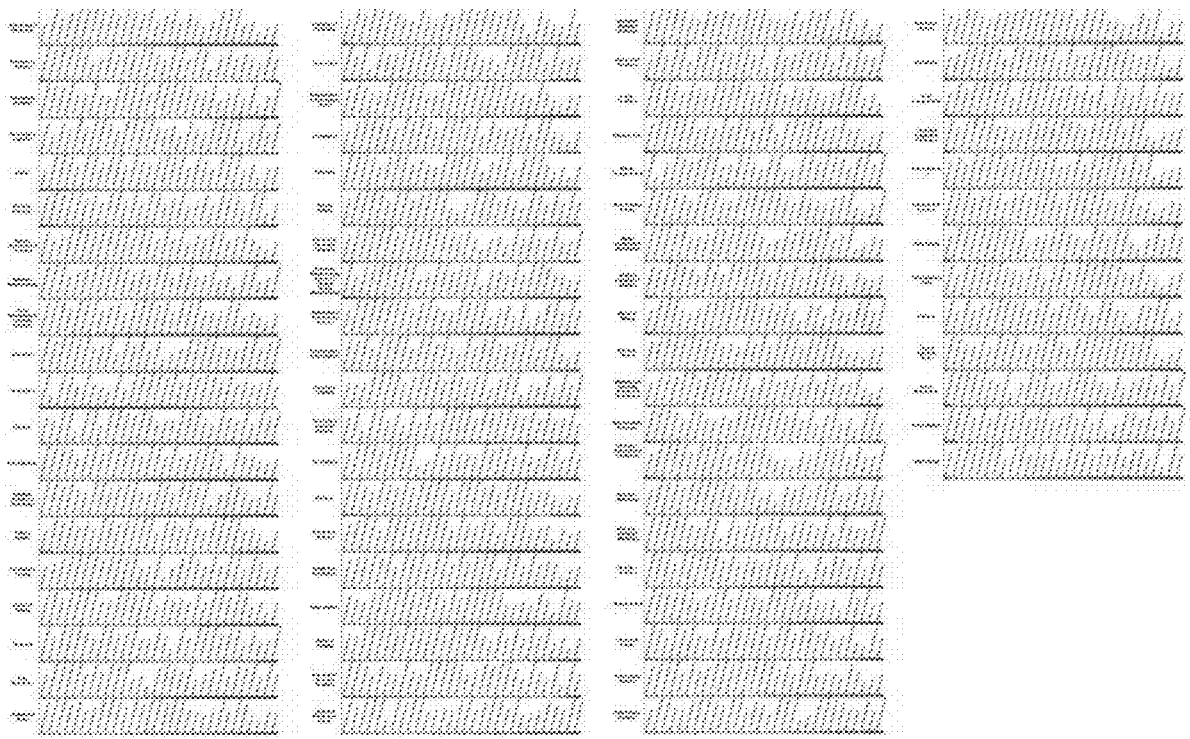
Figure 8:
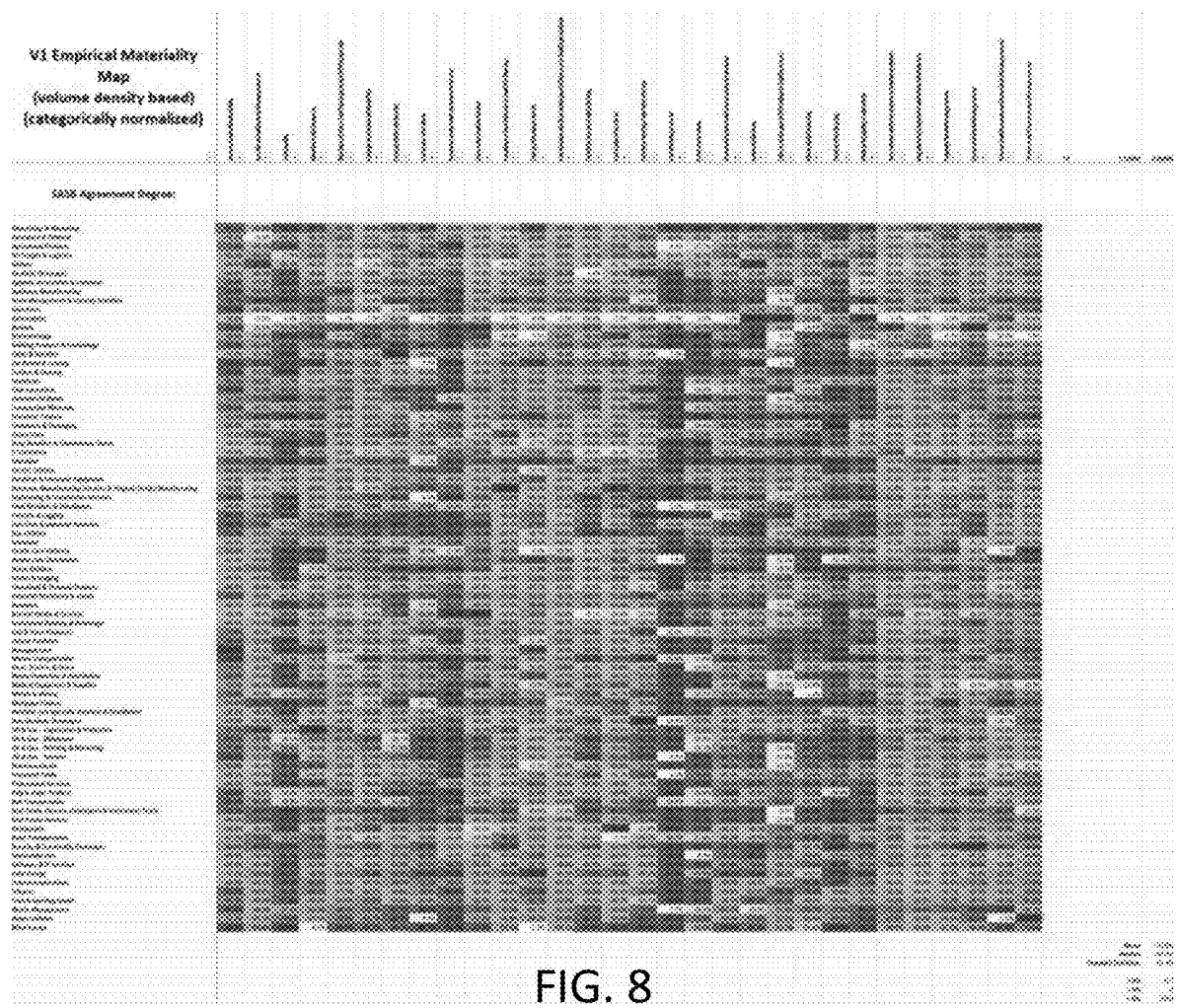
FIG. 8 illustrates the degree of correlation between dynamically derived materiality distributions and the statically defined materiality maps, in accordance with various embodiments.

In various embodiments, FIGS. 7-9 depict images excerpted from actual numerical results. FIG. 7A illustrates a normalized relative volume tabulation (observation counts) for the entity classes (industries) along the vertical axis versus features of interest 304 (SASB categories) across the horizontal axis (white is at the median, blue is below and red is above, with relative shading along the range). FIGS. 7B (close-up) and 7C (full) show a spectral sorting of the features of interest 304 (SASB categories) by volume metric for each entity class (industry).

FIG. 8 shows the degree of correlation with the static SASB categories (white is at the zero, blue is below and red is above, with relative shading along the range), in accordance with various embodiments.

Figure 9A:
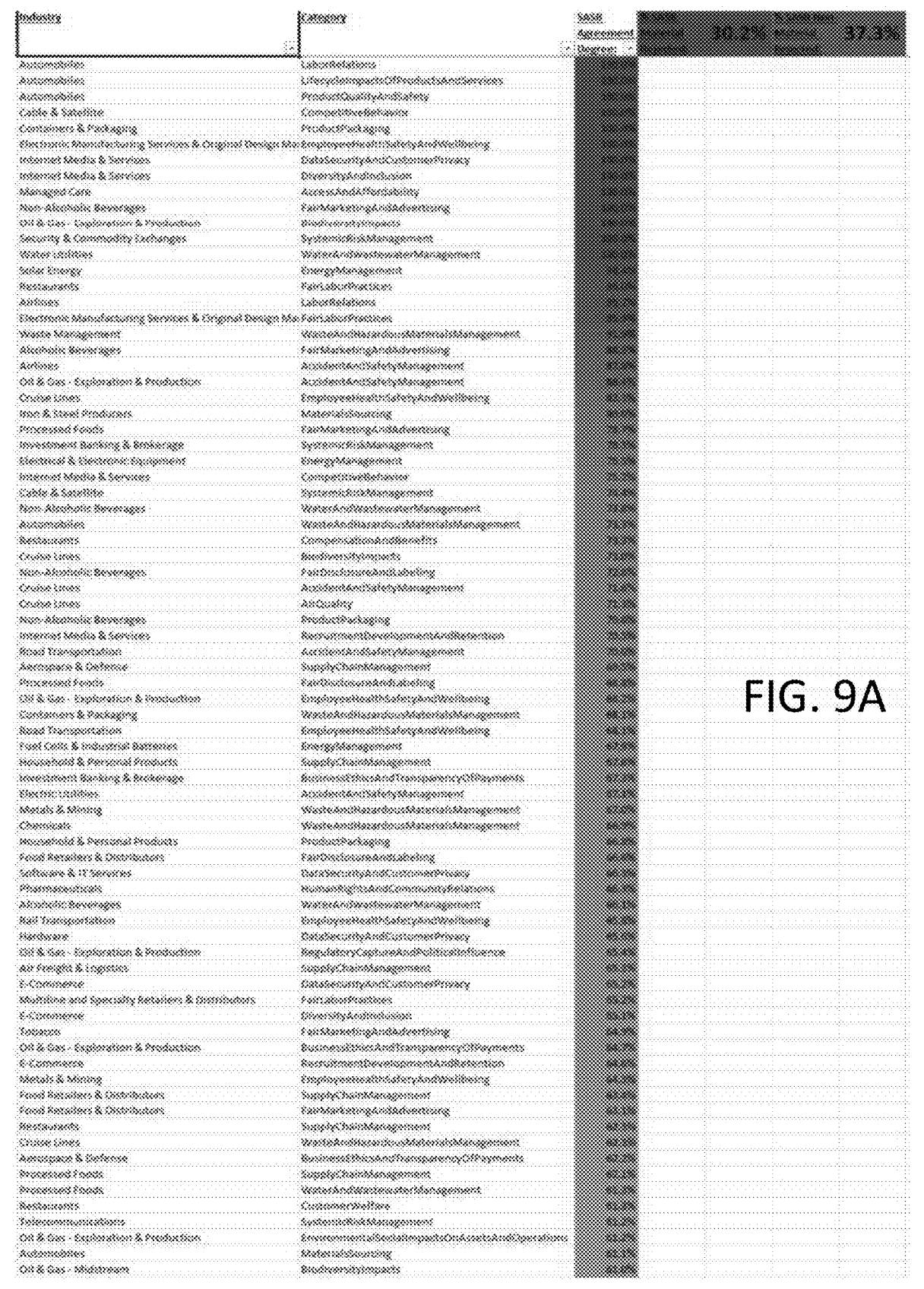
Figure 9B:

FIG. 9A (close-up) and FIG. 9B (full) shows a sort of that degree of correlation, and summary numbers indicating the degree of non-overlap of the empirically tabulated dynamic materiality distribution with the static SASB features of interest 304, indicating how the empirical data can be used to produce more refined feature of interest taxonomies, in accordance with various embodiments.

Figure 10:
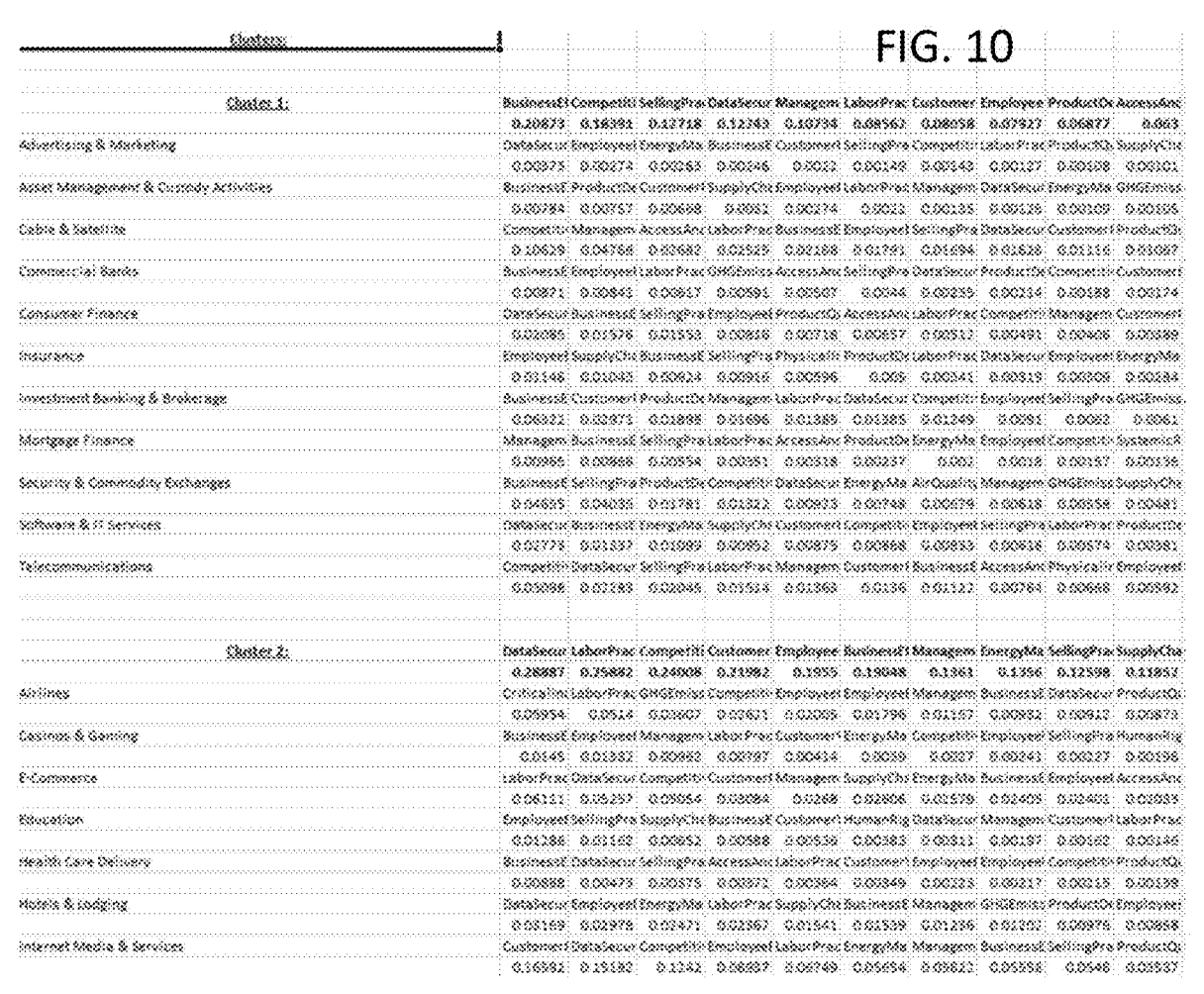
Figure 11:
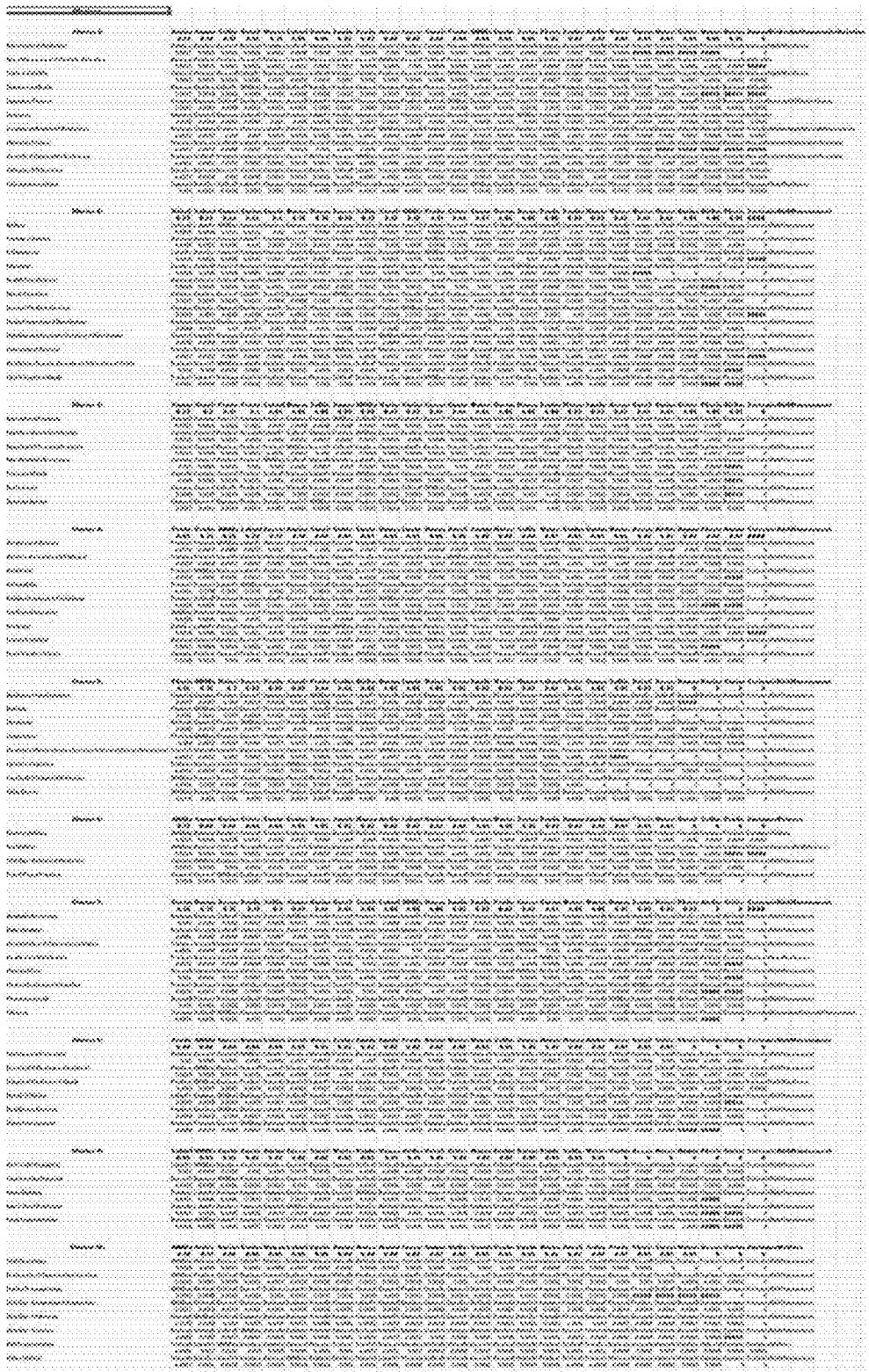

In various embodiments, the subsequent figures illustrate dynamic classification outcomes based on dynamic signatures. FIG. 10 (close-up) and FIG. 11 (entire) illustrate the results of clusters formed across the dynamic signatures of SASB pre-classified SICS industries. Each industry has a vector of categories (again, SASB in this case) ordered by a news volume metric (in this case average daily news item count taken over a date range). This is useful in understanding how industries cluster within the space framed by the categories.

Figure 12:
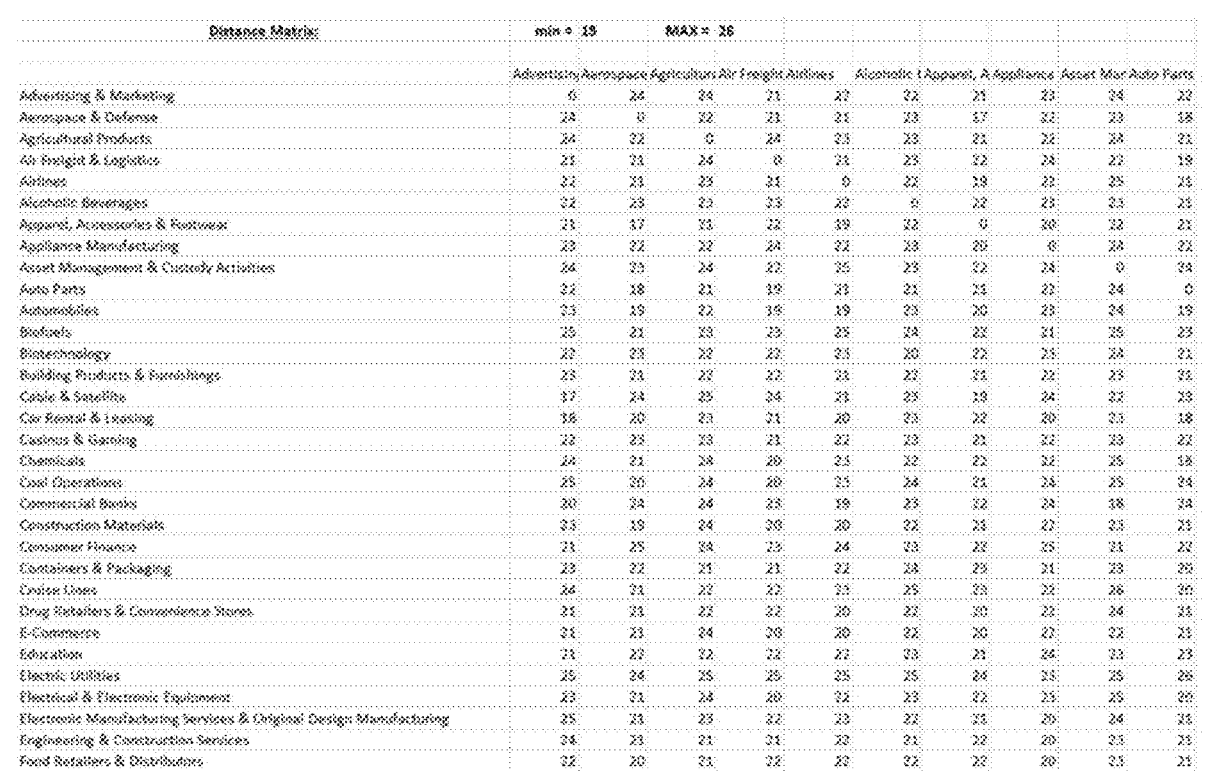
Figure 13:
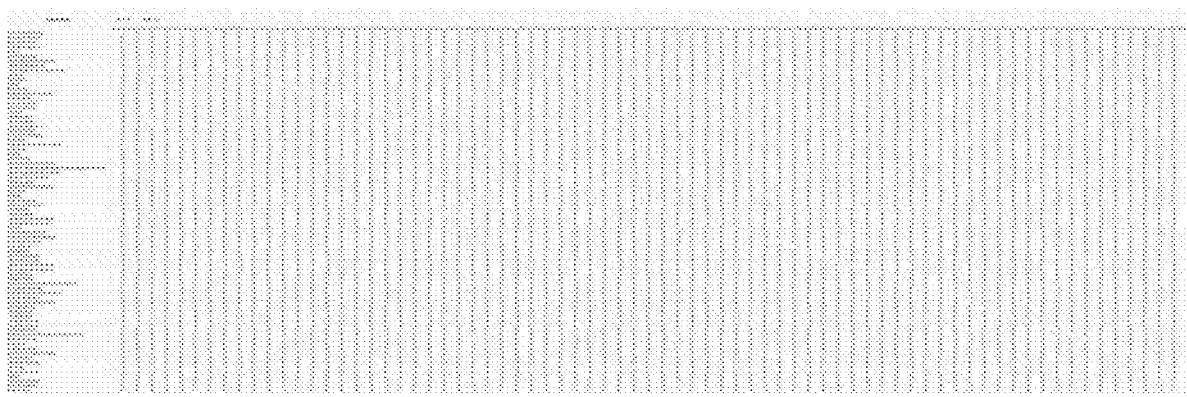

In various embodiments, FIG. 12 (close-up) and FIG. 13 (entire) illustrate the "distance matrix" used in the clustering, having been constructed using the Levenshtein distances between the industry signatures. The Levenshtein distance is a measure of how close the string of ordered category names of one industry is to another by measuring the minimum number of changes to one string need to be made to attain the other. The cross of all such distances tabulated in the distance matrix are then used to determine clusters of industries with similar signatures. In this case, the parameter of 10 clusters was set and a known agglomerative clustering algorithm was applied using the distance matrix as input. Other clustering techniques are similarly applicable here, such as using the volume metrics themselves as coordinates in a high-dimensional space spanned by the categories and then conducting high-dimensional Euclidean clustering.

Figure 14:
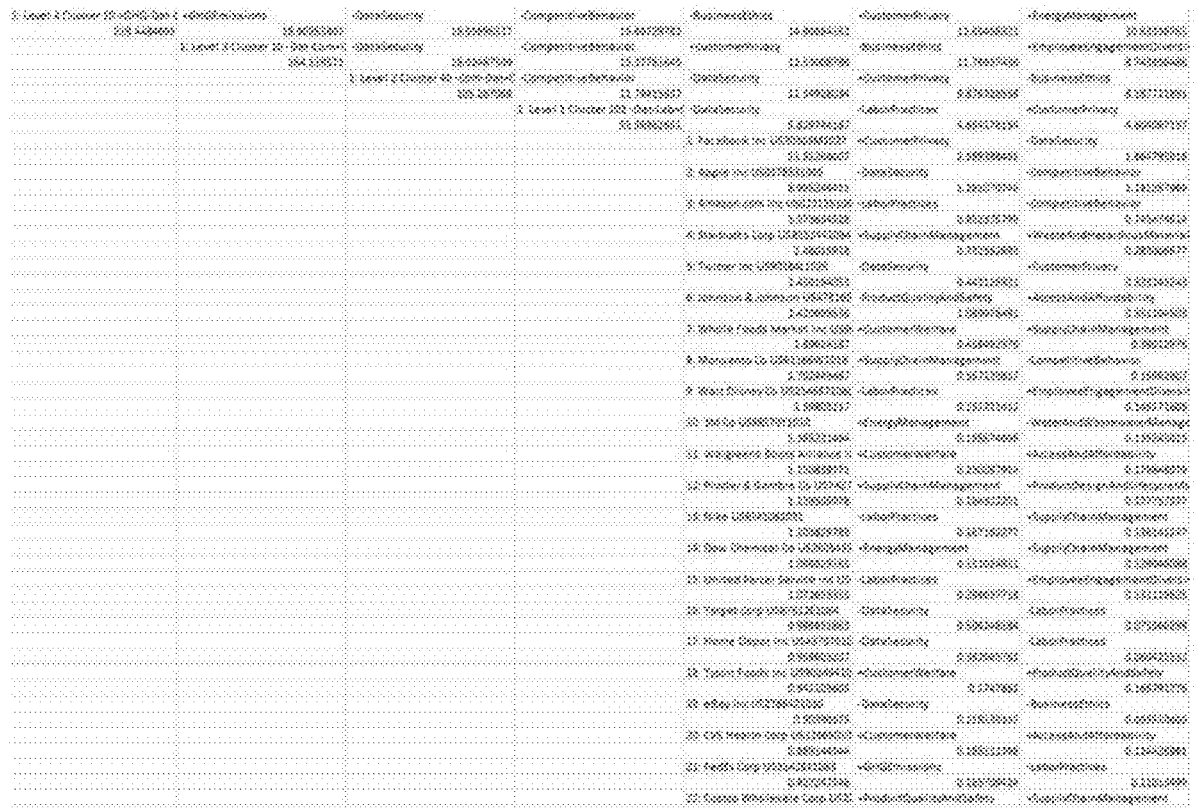
FIGS. 14 and 15 illustrate fully empirical and hierarchical clustering from the entity level upwards, in accordance with various embodiments.
Figure 15:
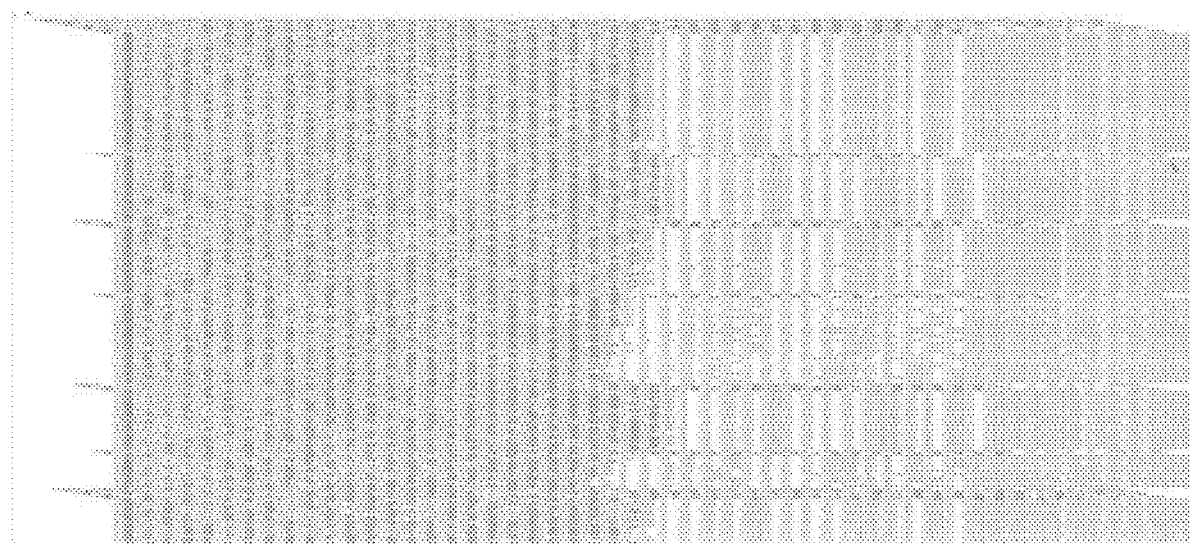
Figure 20:
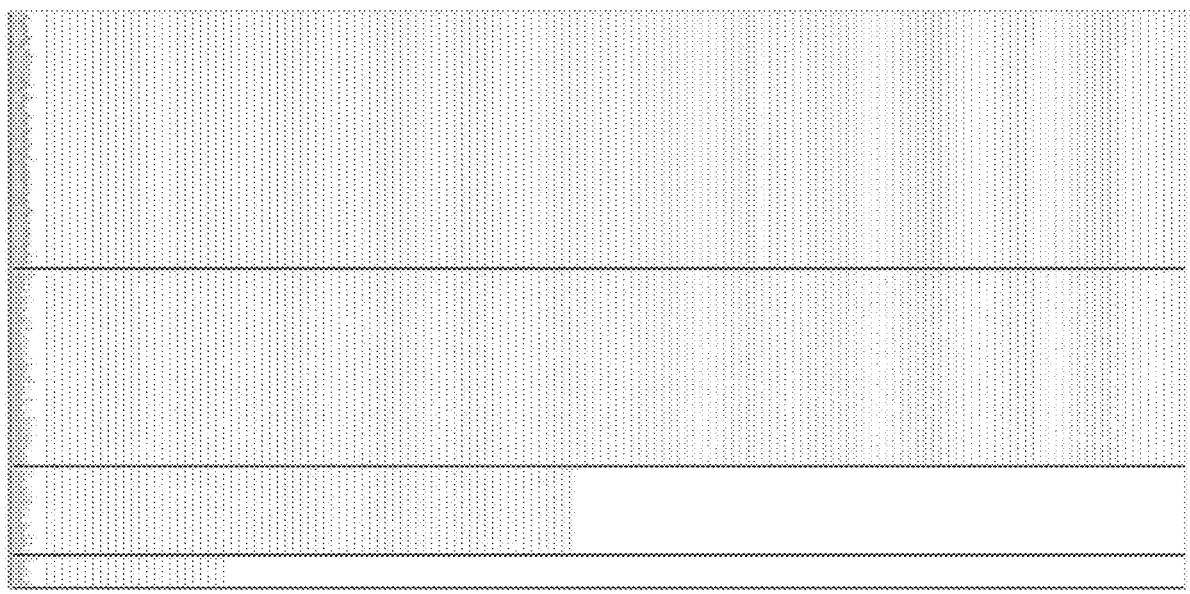

In various embodiments, FIG. 14 (close-up) and FIG. 15 (entire) illustrate fully empirical and hierarchical clustering from the company level upwards. Company signatures are first attained using volume metric-driven categorical sorting as above with Levenshtein distance-based clustering first applied at that level to then attain containing clusters to which signatures can then be ascribed by rolling up the constituent volume metrics and then again sorting the categories. This recursive process may be carried out two additional levels to obtain the structure shown.

FIGS. 16-20 illustrate distance matrices (close-ups and wider views) used at each level to perform the clustering, in accordance with various embodiments.

Systems and methods of the present disclosure generate dynamic, rapidly updated, continuous (versus discrete binary) dynamic materiality distributions to assess materiality within a group of entities. Systems and methods of the present disclosure may also generate dynamic, rapidly updated, continuous entity classifications. These dynamic materiality distributions and dynamic classifications can be built using pre-existing categorizations of features of interest such as the SASB standard sustainability categories. The distributions may also be generated over time as content regarding entities flows into the system by dynamically classifying entities into groups with similar entities and dynamically assessing materiality of the features of interest 304 with respect to the entities. In that regard, systems and methods of the present disclosure analyze incoming observables to determine which observables are relevant to a given entity or group of entities. Systems and methods of the present disclosure thus result in better informed decisions made by observers and stakeholders in related entities and entity classes.

Systems and methods of the present disclosure may generate a core material subset of features of interest 304 that demonstrate outsized and enduring contributions to total volume, identified over time as content regarding entities and features of interest 304 flows into the system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices, systems, and methods are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A data analysis system, comprising:
   a processor and a memory;
   the processor is configured to ingest content from a plurality of data sources with the content comprising a plurality of observables relevant to an entity, wherein each observable from the plurality of observables is related to at least one feature of interest from a plurality of features of interest;
   the processor is further configured to tag the observables with an entity identifier in response to the observables referencing at least one of an entity, a tradename associated with the entity, or product associated with the entity;
   the processor is further configured to tag an observable from the plurality of observables in response to the feature of interest being related to the observable, wherein the analysis engine measures a materiality of the feature of interest to the entity by counting a number of observables from the plurality of observables tagged with the entity identifier;
   the processor is further configured to generate measurability mechanisms based on the tags to create a materiality signature for the entity for a time period during which the plurality of observables were received;
   the processor is further configured to create dynamic materiality using the materiality signature for the entity as a function of time; and
   the processor is further configured to measure a materiality of a particular event using the dynamic materiality;
   wherein the analysis engine is configured to:
      cluster the plurality of observables using a clustering technique;
      assign a plurality of signatures to the clusters; and
      affinitize the signatures using a metric techniques.

2. The data analysis system of claim 1, comprising a graphical user interface that is configured to display the materiality of the feature of interest.

3. The data analysis system of claim 1, comprising a graphical user interface that is configured to allow a user to select the feature of interest which causes a process to be performed by the extraction engine or the analysis engine.

4. The data analysis system of claim 1, wherein the clustering technique is an agglomerative clustering, a Euclidean clustering, or a principal component analysis.

5. The data analysis system of claim 1, wherein the metric technique is Levenshtein Distance agglomerative clustering.

* * * * *